INVENTOR.
HOWARD W. BLETZ

Oct. 17, 1961 H. W. BLETZ 3,005,080
AUTOMATIC TEMPERATURE CONTROL SYSTEM
Filed Nov. 1, 1957 3 Sheets-Sheet 2

INVENTOR.
HOWARD W. BLETZ
BY
Woodling and Krost,
attys.

United States Patent Office 3,005,080
Patented Oct. 17, 1961

3,005,080
AUTOMATIC TEMPERATURE CONTROL
SYSTEM
Howard W. Bletz, Lexington, Ohio, assignor to Stevens
Manufacturing Company, Inc., a corporation of Ohio
Filed Nov. 1, 1957, Ser. No. 693,958
15 Claims. (Cl. 219—20)

The invention relates in general to temperature control systems and more particularly to an electrical control system for controlling the temperature of a heating unit which heats a vessel or cooking utensil wherein the temperature of the vessel is sensed and used for control of the heating unit.

The invention may take many different forms and one immediate use of the temperature control of the invention is to control a burner or heating unit on a stove or range such as a household stove wherein a sensing unit is employed at the heating unit to sense the temperature of the cooking utensil and automatically control the heating unit to maintain a predetermined temperature. This assures that, even should the liquid within the vessel boil away, the heat to the heating unit is reduced sufficiently to maintain substantially constant temperature of the vessel. This is in contradistinction to the burners or heating units now in use on many household stoves wherein the degree of heat produced is completely uncontrolled other than a manual setting and, should the pan or vessel boil dry, the food within the pan would burn because of the considerably smaller heat dissipating properties of the food remaining within the vessel.

Automatic temperature control systems for range or stove surface units are known at the present time, but those in use are considerably more complex and less positive in action than the temperature control of the present invention. And also the presently used automatic temperature controls do not provide as many features as are provided by the present temperature control.

Accordingly, an object of the invention is to provide an automatic temperature control for controlling the temperature of a vessel heated by a heating unit which temperature control is simple, reliable, and economical to manufacture and which has a variety of control functions to accommodate itself to all ordinarily encountered variables.

Another object of the invention is to provide a range surface unit control wherein a sensing unit senses the temperature of the vessel primarily rather than the temperature of the heating unit itself.

Another object of the invention is to provide a temperature control which utilizes low voltage so as to be safe for operation by unskilled persons and also so that heavy electrical insulation need not be used which also necessarily acts as heat insulation.

Another object of the invention is to provide an electrical control system having control contacts provided with a snap action make and break.

Another object of the invention is to provide a temperature control system which inherently operates at its most sensitive point by choice of the impedance of the circuit.

Another object of the invention is to provide a range surface unit control wherein a sensing unit senses the temperature of a pan heated by the surface unit and controls heat imparted to a temperature responsive member to open and close contacts controlling flow of heat to the surface unit.

Another object of the invention is to provide for a heating unit proportioning means which is in addition to the main control which is controlled in proportion to the heat given off by the heating unit to give a proportioning effect which considerably increases the rate of cycling of the contacts as compared to the operation obtained with the main control only.

Another object of the invention is to provide a proportioning control which permits various degrees of boiling of liquid within a vessel heated by the surface unit with various amounts of wattage input without an appreciable change in temperature of the vessel.

Another object of the invention is to provide a compensating means which incorporates a temperature responsive means such as a bimetal element which deflects due to ambient temperature and wherein this deflection is in opposition to the effect produced by deflection of the main and proportioning temperature responsive means so as to keep the contacts in relatively the same position.

Another object of the invention is to provide a voltage compensating means to compensate for changes of voltages applied to the entire temperature control system.

Another object of the invention is to provide a voltage compensating winding which is connected in series with the sensing element coil which senses the temperature of the vessel so that with increased temperature and increased resistance of a sensing coil there is reduced current through the voltage compensating winding which has an additive effect in each of two temperature responsive members relative to the control contacts to thus increase the sensitivity of the entire control.

Another object of the invention is to provide for flow of current to the heating unit through a portion of the temperature responsive means so that heat generated by this passage of current is used to give a proportioning effect which also is a form of compensation for changes of voltage and hence wattage to the unit because, with lower voltage there is a smaller current through the proportioning temperature responsive means which produces longer "on" times of the contacts to compensate for the lower wattage input to the heating unit.

Other objects and a fuller understanding of this invention may be had by referring to the following description and claims, taken in conjunction with the accompanying drawing, in which:

Figure 1:
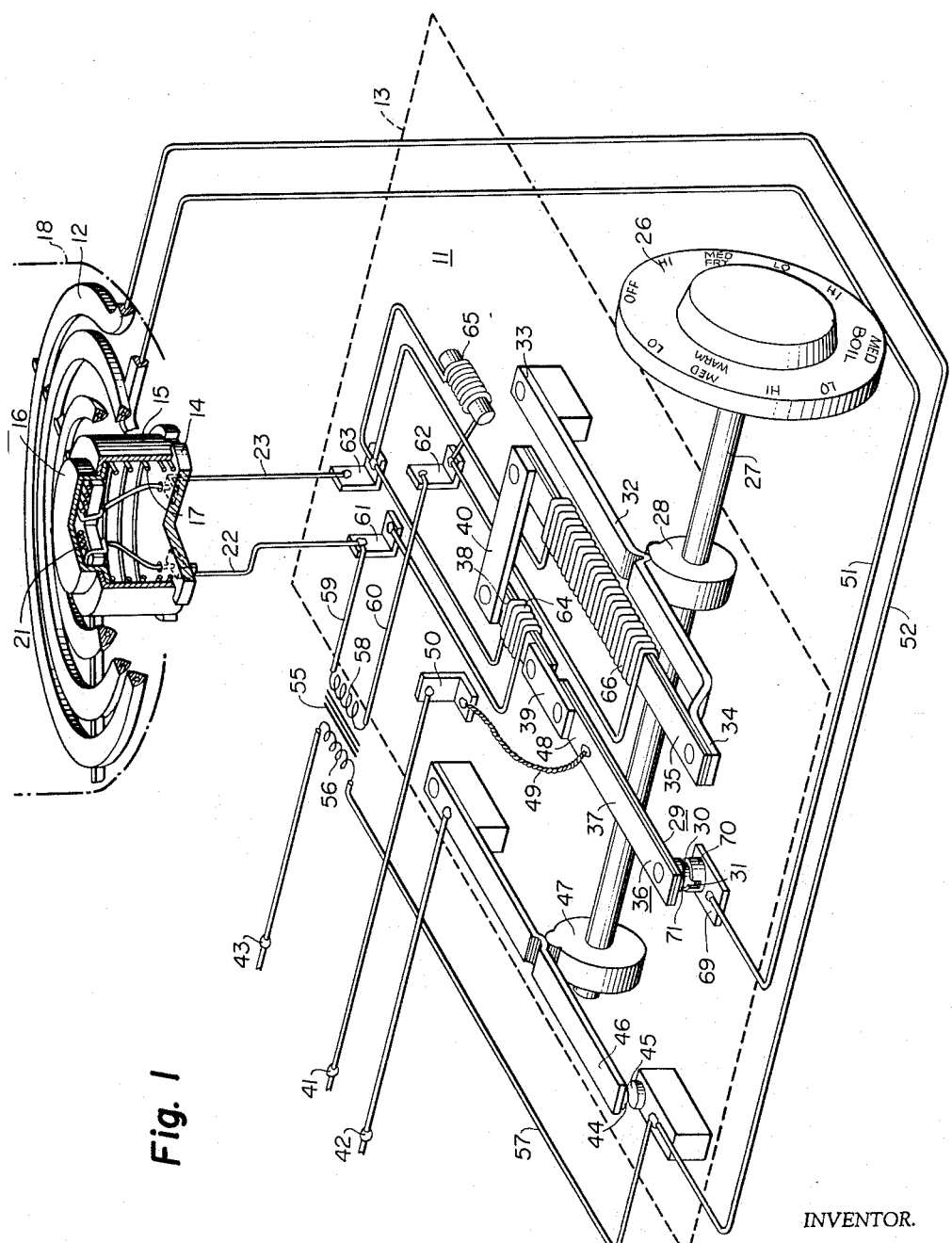
FIGURE 1 is a combined schematic and diagrammatic view of a temperature control and heating unit.

FIGURE 1 shows the preferred embodiment of the invention of a temperature control system 11 for controlling the temperature of a heating unit 12 which in this case has been shown as an electrical heating unit or range surface unit. The control system 11 includes generally two parts contained within a control enclosure 13 and a sensing unit enclosure 14. The sensing unit enclosure 14 is conveniently mounted coaxially with the heating unit 12, although the fact of coaxial mounting is not essential but merely convenient. The enclosure 14 has a cylindrical wall 15 containing a cap 16 which is urged upwardly by a spring 17. This cap 16 normally may be urged by the spring to a level slightly above the level of the heating unit 12 so that, when a pan or a vessel is placed on the heating unit 12, it engages the cap 16 and depresses it against the urging of the spring 17. This assures good physical contact between the cap 16 and vessel 18 for good heat exchange relationship therebetween.

A sensing coil 21 is contained within the cap 16 and covered with thin insulation only sufficient to insulate low voltage such as twenty-four volts; and therefore, with this thin insulation there is good heat exchange relationship between the vessel 18 and the sensing coil 21. Leads 22 and 23 are connected to the ends of the sensing coil 21.

The control enclosure 13 may be placed physically anywhere with respect to the heating unit 12, and this provides considerable flexibility in design of the stove or range with which this temperature control might be used. The control enclosure 13 may be placed at a considerable distance from the heating unit 12 and at any attitude relative thereto because it is not connected thereto by any mechanical linkage, but only by electrical wires which may be, and generally are, flexible. This provides for an advantage of the present temperature control in that the control system 11 may be positioned out of heat exchange relationship with the heating unit 12 so that the ambient temperature around the enclosure 13 may be relatively low to thus assure a sensitive yet dependable and accurate temperature control system.

The control enclosure 13 carries a control knob 26 fastened on a shaft 27 journalled in the enclosure 13 and which carries a cam 28 for adjusting the operating condition of temperature responsive or bimetallic means 29. The bimetallic means 29 has been shown in this preferred embodiment as being a composite structure in a generally U-shape and acting on or controlling control contacts or main contacts 30 and 31. In this particular embodiment, the first control contact 30 is shown as being movable and positioned on the bimetallic means 29 and the second control contact 31 is shown as being stationary. A spring cam follower 32 has a first end 33 fixed in the enclosure 13. This cam follower 32 cooperates with the cam 28 to be moved transversely. A second end 34 of the cam follower 32 carries the bimetallic means 29 which in this case is shown as being U-shaped. Three separate control functions are provided by the bimetallic means 29 and these three separate functions are provided in this case by three separate bimetallic elements which as a composite form the bimetallic means 29. The U-shaped bimetallic means has first and second legs 35 and 36. The first leg 35 is a compensating temperature responsive element or bimetallic element and the second leg 36 includes a proportioning temperature responsive element or bimetallic element 37 and a control or main temperature responsive element or bimetallic element 38. The bimetal elements 37 and 38 are connected by an insulator 39 and the base of the U is another insulator 40. These insulators and bimetal elements are rigidly connected together to make a relatively rigid U-shaped composite structure.

A three-wire voltage supply source is commonly used with this temperature control system and includes a first line 41, a second line 42, and a neutral 43. Lines 41 and 42 may have two hundred thirty volts, for example, and this voltage is supplied to the heating unit 12 through power contacts 44 and 45 and also through the control contacts 30 and 31. The power contact 45 is shown as fixed and power contact 44 is shown as movable and carried on a contact blade 46 controlled by a cam 47 on the shaft 27. The proportioning bimetal 37 has an inboard end 48 to which a flexible pigtail 49 is fixedly attached. The other end of this pigtail 49 goes to a terminal 50 which is connected to the first line 41. By this means the electrical circuit to the heating unit 12 is completed from lines 41 to 42 through the terminal 50, the pigtail 49, the proportioning bimetal 37, contacts 30 and 31, a line 51, the heating unit 12, a line 52, the contacts 44 and 45, the contact blade 46, and returned to the line or voltage source terminal 42.

A transformer 55 has a primary 56 connected between the neutral 43 and a line 57 leading to contact 45; and hence, the circuit to this transformer is connected through contacts 44 and 45 to the second voltage terminal 42. This places the transformer in the circuit and energized at voltage of line to neutral, which may be one hundred fifteen volts, for example. The transformer 55 has a secondary 58 which energizes lines 59 and 60 connected to terminals 61 and 62. The sensing coil 21 is connected between terminal 61 and a terminal 63 and connected in parallel therewith is a control winding 64. A voltage dropping resistor 65 is connected between terminal 62 and 63 and a voltage compensating winding 66 is connected in parallel with resistor 65 between terminals 62 and 63. This makes the electrical circuit for the secondary 58 consist of the paralleled sensing coil 21 and control winding 64 connected in series with the paralleled voltaged dropping resistor 65 and voltage compensating winding 66.

The control contact 31 is mounted on a terminal block 69 and a small permanent magnet 70 surrounds the contact 31. A steel washer-shaped armature 71 surrounds the movable contact 30; and when the contacts 30 and 31 are closed, the armature 71 does not quite touch the magnet 70. The use of the magnet 70 and armature 71 gives a form of snap action to the contacts for quick make and break.

Operation

The present temperature control system is quite simplified and yet has many control functions which permit it to be highly reliable in use. The entire control enclosure 13 may be placed at a remote position from the heating unit 12 so that it is not heated directly by heat exchange from the heating unit 12; and this makes the ambient temperature at the control enclosure quite low and uniform for consistent operation. Also, the entire control system is capable of operating contacts 30 and 31 directly without need of going through a relay in order to obtain an amplification of power.

The control knob 26 has an off position, the position shown in the drawing, and in such position the cam 47 moves the contact blade 46 so that power contacts 44 and 45 are disengaged. Whenever the control knob 26 is moved from this off position, the power contacts 44 and 45 will be closed. The cam 28 has a generally spiral surface to vary the position of the spring cam follower 32 and hence the position of the entire bimetallic means 29. As shown by the legend on the control knob 26, there may be three main temperature ranges, the warm range, the boil range, and the fry range. Each of these may have high, medium, and low settings. If the knob 26 is moved clockwise, it first reaches the low setting in the warm range at which the contact 30 is lowered only slightly, that is, it is positioned its maximum distance away from contact 31, or the least amount of stress in cam follower 32, during any of the operating temperature settings. Other positions of the control knob 26 establish the contact 30 at closer spacings to the contact 31 and thus control the ultimate or desired temperature setting of the vessel 18.

With a vessel 18 resting on the heating unit 12 and also in good heat exchange relationship with the cap 16 and sensing coil 21 and with the control knob 26 positioned at one of the operating settings, current from the line 41 flows through the proportioning bimetal 37 and the heating unit 12. This flow of current heats the vessel 18 and it also heats the proportioning bimetal 37. As the vessel increases in temperature, this also increases the temperature of the sensing coil 21 to increase its resistance. Current from the transformer secondary 58 then is increasingly shunted through the control winding 64 to impart more and more heat to the control bimetal 38. All the bimetals 37, 38, and 35 have the high expansion side on the bottom so that, upon temperature increase, each flexes upwardly. The upward flexing of the control bimetal moves the contact 30 away from contact 31 to break the circuit to the heating unit 12. This is the main control function to control the on and off times of the control contacts 30 and 31 and hence provide the primary control of the average temperature of the heating unit 12 and hence the temperature of the vessel 18. Because the current to the heating unit 12 flows through the proportioning bimetal 37, additional heat is received by this conduction current. This heat causes the proportioning bimetal 37 to deflect upwardly to also open the contacts 30 and 31. When the contacts are open, the conduction current ceases; hence, the proportioning bimetal 37 cools to reclose the control contacts 30 and 31. This gives a proportioning effect which considerably increases the rate of cycling as compared to the operation obtained with the control bimetal 38 alone. This is desirable because it gives a more uniform temperature control of the vessel 18 throughout the entire temperature range as selected by the control knob 26.

The resistance of the sensing coil 21 is preferably made of low value, for example, ten to twenty ohms, and the resistance of the control winding is preferably made of the same order. This substantial equality of the two resistance values means that inherently the device has the greatest sensitivity of which it is capable.

The compensating bimetal 35 provides compensation for changes in ambient temperature. The entire bimetallic means 29 is positioned in one location; namely, within the control enclosure 13, hence the ambient temperature thereabouts will be uniform on all parts of the legs of the U-shaped bimetallic means 29. If this ambient temperature increases, the compensating bimetal 35 deflects upwardly as to the control and proportioning bimetals 38 and 37. The construction, however, is such that this deflection of the compensating bimetal opposes the deflection of the combined bimetals 37 and 38. This is so because the base of the U, insulator 40, will deflect upwardly under action of the compensating bimetal 35 since end 34 is stationary in any given operating position, and this upward deflection of insulator 40 is the same as that deflection caused by increased ambient temperature on the bimetals 37 and 38 which make up the second leg 36. Consequently, the control contact 30 remains in the same position as formerly.

The voltage compensating winding 66 is connected in series with the paralleled sensing coil 21 and control winding 64 to thus compensate for voltage changes. An increase of voltage, for example, at the supply terminals 41, 42, and 43 causes increased voltage at the secondary 58. This causes increased voltage on the control winding 64 to increase the heating effect thereof on bimetal 38. However, a proportionate change in voltage is also applied to the compensating bimetal 35 by the voltage compensating winding 66 so that both legs 35 and 36 of the U-shaped bimetal are affected equally to thus maintain contact 30 in the same position as before. The voltage dropping resistor 65 permits control of the amount of heat to be imparted to the compensating bimetal 35 by the voltage compensating winding 66.

The fact that the voltage compensating winding 66 is is series with the parallel circuit of control winding 64 and sensing coil 21 provides increased sensitivity to the entire control system 11. Increased temperature, for example, on the sensing coil 21 increases its resistance to shunt more current through the control winding 64. At the same time the total effective resistance of the paralleled circuit sensing coil 21 and control winding 64 increases to thus decrease the current in the compensating winding 66 since it is in series therewith. This decreased current in compensating winding 66 tends to make the compensating bimetal 35 deflect downwardly, whereas at the same time the control bimetal 38 is deflecting upwardly. These deflections are additive in effect toward opening the contacts 30 and 31 and, as a result, the contacts have about twice the movement they would have considering only the control winding 64 alone.

The fact that the sensing coil 21 is operated on low voltage, e.g., twenty-four volts, means that the electrical insulation on this sensing coil may be very thin and, as a result, the heat insulating properties are very small so that the entire control system 11 inherently has very good temperature sensing properties to maintain closely the desired temperature.

The flexible pigtail 49 is a means of imparting heat to the proportioning bimetal 37 which heat is proportional to the heating effect of the heating unit 12. A heater winding similar to windings 64 or 66 could have been used to carry the load current and impart heat to the proportioning bimetal 37; however, this would have necessitated electrical insulation therebetween which would have been heat insulation, and it is found that the present system of conduction current heating of the proportioning bimetal 37 is preferable. In case of low voltage on the supply terminals 41 and 42 and hence on the heating unit 12, both the wattage and current are decreased. This smaller current flowing through the proportioning bimetal 37 produces longer on times and shorter off times of the contacts 30 and 31 which compensates for the lower wattage input to the heating unit 12. The opposite is true in case of a voltage increase which proportionately decreases the length of the on times with respect to the off times.

The proportioning bimetal 37 also performs still another and very important function; namely, to permit various rates of boiling with various wattage input to the heating unit 12 without appreciable change in temperature of the vessel 18. This is one of the most serious problems to overcome in any automatic temperature control of a vessel heated by a heating unit. It will be noted that the temperature of the vessel 18 increases throughout the warm range and again throughout the fry range, but during the boil range, which principally means the boiling of water, the temperature of the vessel will stay at about two hundred twelve degrees Fahrenheit. Various amounts of boiling are required, however. In other words, low, medium, and high boil settings should be provided in order to give the operator a choice of amounts of boiling.

Figure 7:
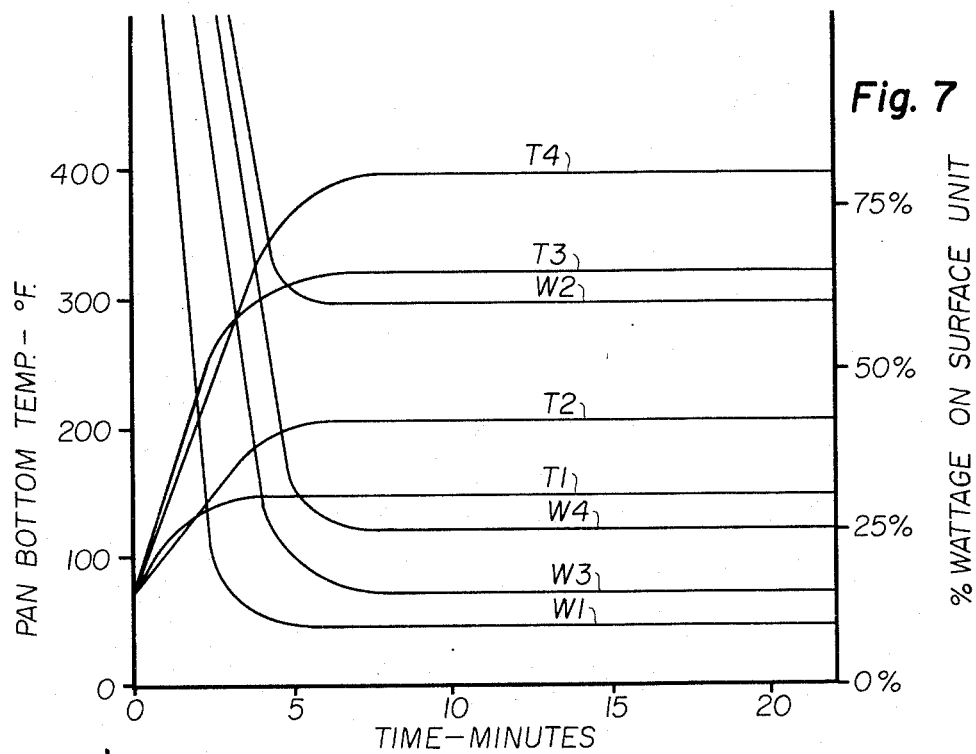
FIGURE 7 is a graph of temperature versus time.

FIGURE 7 shows a graph of temperature versus time, the temperature being the temperature of the bottom of the vessel 18. Curves T1 and W1 are paired, and curve T1 is a graph of temperature versus time for the medium warm setting of the control knob 26. The companion curve W1 is a curve of wattage of the heating unit 12 versus time for this same medium warm setting. This indicates that, after a temperature is reached, the control contacts 30 and 31 are closed only about ten to twelve percent of the time to maintain this medium warm temperature.

Curves T2 and W2 are paired, with these curves being temperature and wattage, respectively, plotted against time for a medium boil setting of a vessel containing water. It will be noted that this is the highest wattage input of any of the curves and requires the control contacts 30 and 31 to be closed about sixty percent of the time, yet the temperature is not much greater than before. Curves T3 and W3 are paired and show temperature and wattage for a medium boil setting with a dry vessel. This indicates that, when water should boil off the vessel, the heat input requirements of the vessel are very greatly reduced and instead of requiring the contacts to be closed about sixty percent of the time, they need be closed only about fifteen percent of the time. This curve T3 shows the safeness of the present temperature control system 11 because, even should the vessel 18 boil dry, the temperature would increase only about fifteen percent; namely, from about two hundred twelve degrees to three hundred twenty degrees, which is not a high enough temperature to burn the food. Without this automatic temperature control, should a vessel boil dry, the temperature could easily reach seven hundred or eight hundred degrees which quickly burns the food cooking within the vessel.

Curves T4 and W4 are paired and show temperature and wattage, respectively, for a medium fry setting. This shows that with grease or the like in the vessel 18 for a frying condition at about four hundred degrees, the wattage input is so small as to require closing of the contacts only about twenty-five percent of the time. A comparison of the W2 and W4 curves shows that far less wattage input is required for a medium fry, which is at a higher temperature, than for a medium boil, which is at a lower temperature. This particular problem comes about because of the natural phenomenon of requiring tremendous amounts of heat to change liquid into steam without changing its temperature compared with raising the temperature of the same amount of liquid one degree. Practically all automatic temperature control systems in the past have failed to adequately provide this boil range in the boil range period.

The proportioning bimetal 37 permits this great increase in wattage from one end to the other of the boil range without appreciable increase in temperature of the vessel 18. It does this by the fact that the cam 28 effectively changes the position of control contact 30 or, looking at it in another way, it changes the stress on the bimetals so as to change the opening and closing temperatures of the control contacts 30 and 31. For a high boil setting the contact 30 is positioned closer to contact 31 than those for a low boil setting. This means that greater conduction current caused by longer on times is required to create the added deflection to the proportional bimetal 37 in order for contacts 30 and 31 to be opened with the high boil settings. Thus, the proportioning bimetal changes the proportion of on times to off times throughout the boil range so that low, medium, and high boil settings may be obtained.

Figure 8:
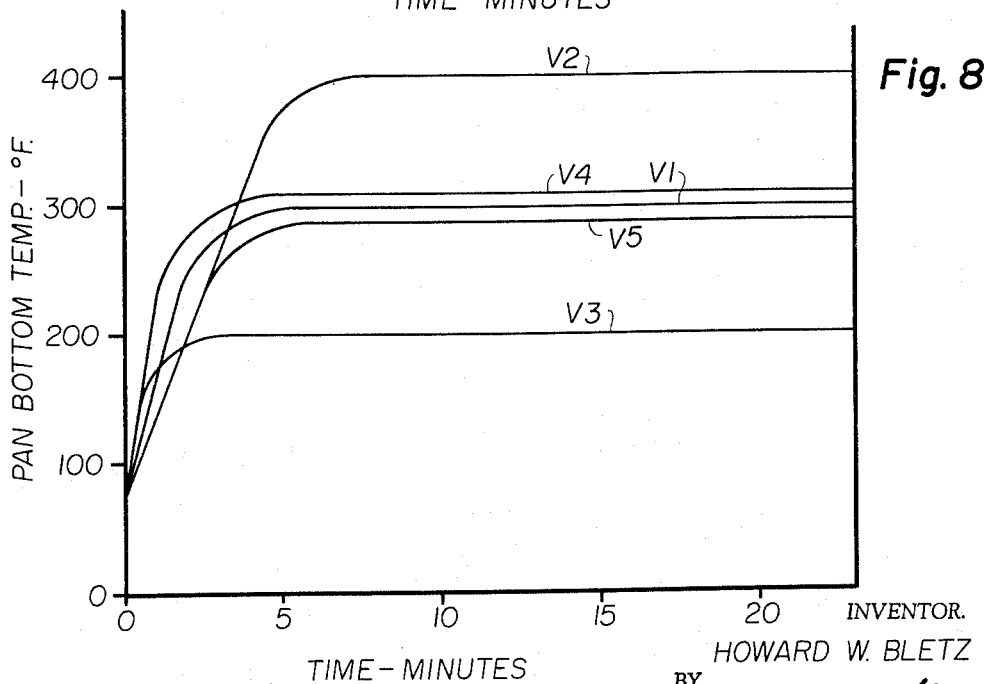
FIGURE 8 is another graph of temperature versus time.

The FIGURE 8 shows a curve of temperature versus time and shows the advantages of the voltage compensating winding 66. Curve V1 shows temperature at a three hundred degree setting with normal voltage. If the voltage compensating winding 66 is not used, curve V2 shows the temperature of the vessel 18 at low voltage with the control knob 26 still remaining at the three hundred degree setting. Low voltage causes high temperature on the vessel 18, without voltage compensation, because there will be low voltage on control winding 64 to impart a smaller amount of heat to the control bimetal 38. This means that higher temperature of the vessel 18 and sensing coil 21 is required in order to make the control bimetal 38 deflect sufficiently to open the contacts. Curve V3 shows temperature at the three hundred degree setting with high voltage at the terminals 41 and 42, again without voltage compensation. Curves V4 and V5 show the maximum variation of temperature from the norminal three hundred degree setting at the same high and low voltages, respectively, as curves V2 and V3, with voltage compensation of winding 66.

Figure 2:
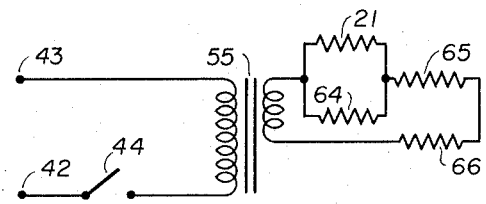
FIGURE 2 is a modification of a part of FIGURE 1.

FIGURE 2 shows a modification of part of the circuit of FIGURE 1 again with the sensing coil 21 and control winding 64 in parallel, but with the voltage dropping resistor 65 and the voltage compensating winding 66 in series. This has the advantage of smaller resistance on the compensating winding 66 for less use of wire. FIGURE 1 has the advantage over FIGURE 2; however, in that with the larger number of turns on the compensating winding 66, a greater uniformity among controls manufactured may be achieved.

Figure 3:
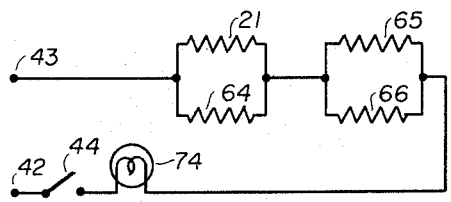
FIGURE 3 is another modified circuit arrangement of FIGURE 1.

FIGURE 3 shows another modification of the circuit of FIGURE 1 in the use of a pilot lamp 74 connected in series with the series combination of paralleled coil 21 and winding 64 and paralleled resistor 65 and winding 66. This pilot lamp 74 drops the voltage to a low value and eliminates need for the transformer 55.

Figure 4:
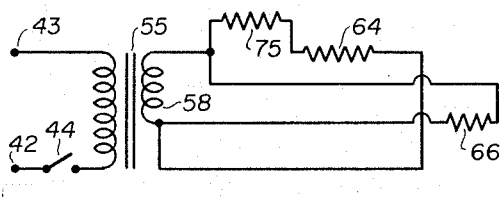
FIGURE 4 shows still another modification of the circuit.

FIGURE 4 shows another variation in the circuit of FIGURE 1 by use of a thermistor 75 which is placed within the cap 16 to sense the temperature of the bottom of the vessel 18. The thermistor has a negative temperature coefficient and, hence, it is placed in series with the control winding 64 with this control winding 64 again in heat exchange relationship with the control bimetal 38. The voltage compensating winding 66 in this case is connected directly across the secondary 58 and is placed in heat exchange relationship with the compensating bimetal 35 as before.

Figure 5:
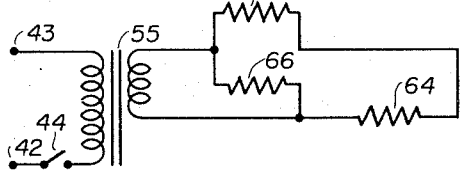
FIGURE 5 shows still another modification to FIGURE 1.

FIGURE 5 shows another modification of FIGURE 1 wherein the control winding 64 and voltage compensating winding 66 have been reversed in their position on the legs of the bimetallic means 29. The control winding 64 in this case is placed in heat exchange relationship with the compensating bimetal 35 because it is connected in series with the sensing coil 21. Consequently, the voltage compensating winding 66 is placed in heat exchange relationship with the bimetal 38. With an increase in temperature on the sensing coil 21, this decreases the current through control winding 64 to cause bimetal 35 to deflect downwardly and this opens the control contacts. Increases of voltage at terminals 42 and 43 increase the voltage on control winding 64 and a proportionate increase of voltage is supplied to the voltage compensating winding 66; and since these increased voltages apply heat to opposite legs of the bimetallic means 29, their effect is cancelled out as before.

Figure 6:
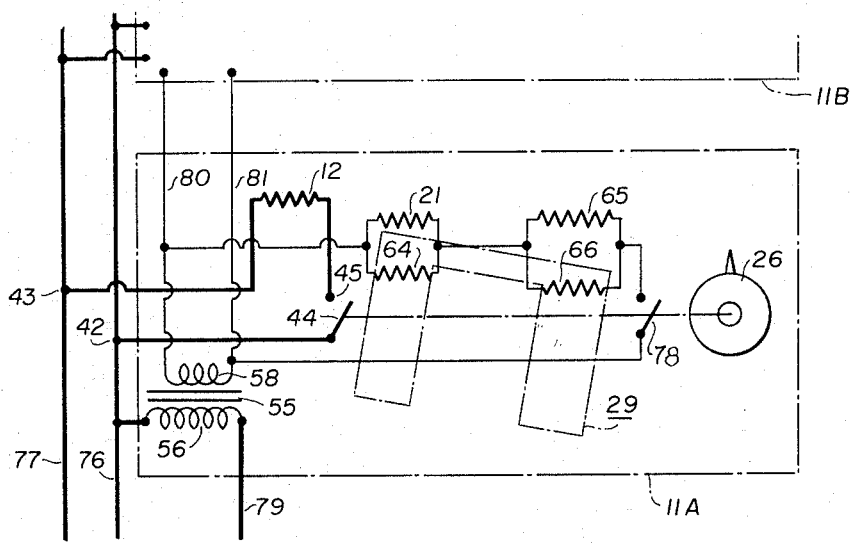
FIGURE 6 is another modification of the electrical circuit.

FIGURE 6 shows a still further modification of FIGURE 1 for control of multiple heating units 12. Lines 76 and 77 supply the voltage terminals 42 and 43 for the temperature control system 11A and also supply voltage to other similar units such as 11B. The control system 11A is similar to control system 11 of FIGURE 1 and has a similarly placed and connected sensing coil 21, control winding 64, voltage dropping resistor 65, and voltage compensating winding 66. The knob 26 controls the power contacts 44 and 45 as before and additionally controls an auxiliary switch 78 which is in series with the secondary 58 of transformer 55 to control flow of current to all elements 21, 64, 65 and 66. The transformer 55 has the primary 56 connected directly between lines 76 and a neutral line 79 with the secondary 58 also feeding control lines 80 and 81 which additionally lead to and supply low voltage energy to control system 11B and other additional control systems if desired. The circuit of FIGURE 6 permits control of multiple control systems with only a single transformer 55.

The voltage source 41, 42, and 43 is a form of potential heat energy to supply heat to the heating unit 12 which source also might be a gas or oil supply pipe with unit 12 being a fluid fuel burner. The main or control contacts 30 and 31 are operating portions controlling the flow of this potential energy from the source to the heating unit 12 and are shown as an electrical switch but might be the operating portions of a fluid valve, for example.

The appended claims form a part of the disclosure of the invention in conjunction with the foregoing specification.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A temperature control operable from a voltage source to control heat of a vessel heated by a heating unit operable from a source of potential heat energy, comprising, in combination, first and second relatively movable operating portions, means to connect said operating portions to said heat energy source to control the flow of potential heat energy to said heating unit, means to relatively vary the position of said operating portions to adjust the operating condition thereof, sensing control means connected to said voltage source to relatively vary the position of said operating portions to decrease the heat energy input to said unit upon increase in temperature of said vessel, proportioning control means to relatively vary the position of said operating portions to decrease the heat energy imput to said heating unit upon temperature increase of said heating unit, and voltage compensating control means connected to said voltage source to relatively vary the position of said operating portions to increase the heat energy input to said unit upon increase of voltage of said voltage source to counterbalance increased voltage on said sensing control means which additionally tends to decrease the heat energy imput to said unit.

2. A temperature control operable from a voltage source to control heat of a vessel heated by a heating unit operable from a source of potential heat energy, comprising, in combination, first and second relatively movable operating portions, means to connect said operating portions to said heat energy source to control the flow of potential heat energy to said heating unit, manually adjustable means to relatively vary the position of said operating portions to adjust the operating condition thereof, sensing control means positioned for heat exchange relationship with said vessel and connected to said voltage source to relatively vary the position of said operating portions to decrease the heat energy imput to said unit upon increase in temperature of said vessel, proportioning control means connected to receive heat proportional to heat of said heating unit and connected to said voltage source to relatively vary the position of said operating portions to decrease the heat energy imput to said heating unit upon temperature increase of said heating unit, voltage compensating control means connected to said voltage source to relatively vary the position of said operating portions to increase the heat energy imput to said unit upon increase of voltage of said voltage source to compensate for increased voltage on said sensing control means which additionally tends to decrease the heat energy input to said unit, and ambient temperature control means including at least two of said proportioning control, sensing control, and voltage compensating control means with said at least two acting in opposition for increases in ambient temperature to thus hold said operating portions relatively stationary.

3. A temperature control for a vessel heated by a heating element energizable from a voltage source, comprising, in combination, first and second control contacts, means to connect said voltage source in circuit relationship with said control contacts and with said heating element for energization thereof, manually adjustable means to relatively vary the position of said control contacts to adjust the operating condition thereof, proportioning control means to relatively separate said contacts upon flow of current to said heating element, sensing control means connected to said voltage source to relatively separate said contacts upon increase in temperature of said vessel, and voltage compensating control means to relatively move said control contacts toward each other upon increase of voltage of said voltage source to compensate for increased voltage on said sensing control means which additionally tends to separate said control contacts.

4. A temperature control for a vessel heated by a heating element energizable from a voltage source, comprising, in combination, first and second control contacts, means to connect said voltage source in circuit relationship with said control contacts and with said heating element for energization thereof, manually adjustable means to relatively vary the position of said control contacts to adjust the operating condition thereof, proportioning control means to relatively separate said contacts upon flow of current to said heating element, sensing control means connected to said voltage source to relatively separate said contacts upon increase in temperature of said vessel, voltage compensating control means to relatively move said control contacts toward each other upon increase of voltage of said voltage source to compensate for increased voltage on said sensing control means which additionally tends to separate said control contacts, and ambient temperature control means including at least two of said proportioning control, sensing control, and voltage compensating control means with said at least two acting in opposition for increases in ambient temperature to thus hold said control contacts relatively stationary.

5. A temperature control for control of heat to a vessel operable through a boil range and heated by a heating element energizable from a voltage source, comprising, in combination, first and second control contacts, means to connect said voltage source through said control contacts to said heating element for energization thereof, manually adjustable means to relatively vary the position of said control contacts to adjust the operating condition thereof, sensing control means connected to said voltage source to relatively separate said contacts upon increase in temperature of said vessel, proportioning control means connected to said voltage source to relatively separate said contacts upon flow of current to said heating element and connected to vary the average wattage imput to said heating element for various rates of boiling in said boil range, voltage compensating control means to relatively move said control contacts toward each other upon increase of voltage of said voltage source to compensate for increased voltage on said sensing control means which additionally tends to separate said control contacts, and ambient temperature control means including said proportioning and compensating control means acting in opposition for increases in ambient temperature to thus hold said control contacts relatively stationary.

6. A temperature control circuit for a heating unit and operable from a voltage source, comprising, a sensing element adapted to be placed in heat exchange relationship with a vessel in heat exchange relationship with said heating unit, control contacts connected in circuit relationship with said voltage source for controlling the heat of said heating unit, bimetallic means connected to operate said control contacts, first means for imparting heat to said bimetallic means from said sensing element, voltage compensation means including said bimetallic means and including first and second bimetallic elements acting in opposition on one of said control contacts and including said first means, and proportioning control means imparting heat to said bimetallic means in accordance with the power supplied to said heating element.

7. A temperature control circuit for an electric heating element energizable from a voltage source, comprising, in combination, a sensing element adapted to be placed in heat exchange relationship with a vessel in heat exchange relationship with said heating element, control contacts connected in circuit relationshp with said heating element and said voltage source for controlling the flow of current to said heating element, bimetallic means connected to operate said control contacts, first means for imparting heat to said bimetallic means from said sensing element, voltage compensation means including said bimetallic means and including first and second bimetallic elements acting in opposition on one of said control contacts and including said first means, and proportioning control means imparting heat to said bimetallic means in accordance with the power supplied to said heating element.

8. A temperature control circuit for an electric heating element energizable from a voltage source, comprising, in combination, a sensing element adapted to be placed in heat exchange relationship with a vessel in heat exchange relationship with said heating element, control contacts connected in circuit relationship with said heating element and said voltage source for controlling the flow of current to said heating element, bimetallic means connected to operate said control contacts, ambient temperature compensation means including said bimetallic means and comprising first and second bimetallic elements acting in opposition relative to one of said control contacts, first means for imparting heat to said bimetallic means from said sensing element, voltage compensation means including said first and second bimetallic elements acting in opposition on said one of said control contacts and including said first means, and proportioning control means imparting heat to said bimetallic means in accordance with the current supplied to said heating element.

9. A temperature control circuit for an electric heating element energizable from a voltage source, comprising, in combination, a sensing element adapted to be placed in heat exchange relationship with a vessel in heat exchange relationship with said heating element and also placed in heat insulated relationship with said heating element, control contacts connected in circuit relationship with said heating element and said voltage source for controlling the flow of current to said heating element, bimetallic means connected to operate said control contacts, manually adjustable means to adjust the average temperature setting of said heating element including a boil range with high, medium, and low boil settings and adapted to vary the relative position of said control contacts, ambient temperature compensation means including said bimetallic means and comprising first and second bimetallic elements acting in opposition relative to one of said control contacts, first means for imparting heat to said bimetallic means from said sensing element to open and close said control contacts, voltage compensation means including said first and second bimetallic elements acting in opposition on said one of said control contacts and including said first means, and proportioning control means imparting heat to said bimetallic means in accordance with the power supplied to said heating element to change the proportion of on time to off time of said control contacts during said boil range settings for low, medium, and fast boil settings.

10. A temperature control for a heating element for heating a vessel and energizable from a voltage source and operable through a boil range, comprising, in combination, contact means relatively movable between on and off conditions to control the power input to said heating element, a sensing element variable in resistance in accordance with temperature and adapted to be positioned in heat exchange relationship with said vessel, means to connect said sensing element for energization from said voltage source, control bimetallic means, a control winding electrically connected to said sensing element to impart heat to said control bimetallic means to tend to open said contact means with increasing temperature on said sensing element, proportioning bimetallic means acting on said contact means to relatively move same toward disengagement upon power being supplied to said heating element, compensating bimetallic means tending to close said contact means upon increasing temperature of said compensating bimetallic means, means for supporting said control, proportioning and compensating bimetallic means in substantially the same degree of heat exchange relationship with said heating element, and voltage compensating winding means connected in circuit with said sensing element and positioned in heat exchange relationship with said compensating bimetallic means, whereby changes in voltage of said voltage source are imparted both to said control winding and to said voltage compensating winding means to affect substantially equally said control bimetallic means and said compensating bimetallic means to effect substantially no change in the relative position of said contact means, and whereby increases in ambient temperature of said bimetallic means are substantially cancelled out therein to effect substantially no change in relative position of said contact means.

11. A temperature control for a heating element for heating a vessel and energizable from a voltage source and operable through a boil range, comprising, in combination, first and second control contacts relatively movable between on and off conditions to control the power input to said heating element, a sensing element variable in resistance in accordance with temperature and adapted to be positioned in heat exchange relationship primarily with said vessel and positioned in lesser heat exchange relationship with said heating element, means to connect said sensing element for energization from said voltage source, control bimetallic means acting on said control contacts, a control winding electrically connected to said sensing element to impart heat to said control bimetallic means to tend to open said control contacts with increasing temperature on said sensing element, proportioning bimetallic means conducting current to said heating element and acting on said control contacts to relatively move said contacts apart upon current being supplied to said heating element, compensating bimetallic means acting on said control contacts tending to close said control contacts upon increasing temperature of said compensating bimetallic means, means for supporting said control, proportioning, and compensating bimetallic means in substantially the same degree of heat exchange relationship with said heating element, adjustment means acting on at least one of said bimetallic means and positioned to vary the relative spacing of said first and second control contacts to vary the operating conditions of said temperature control, and voltage compensating winding means connected in circuit with said sensing element and positioned in heat exchange relationship with said compensating bimetallic means, whereby changes in voltage of said voltage source are imparted both to said control winding and to said voltage compensating winding means to affect substantially equally said control bimetallic means and said compensating bimetallic means to effect substantially no change in the relative position of said control contacts, whereby increases in ambient temperature of said bimetallic means are substantially cancelled out therein to effect substantially no change in relative position of said control contacts, and whereby changes of position of said adjustment means through said boil range requires changing amounts of current through said proportioning bimetallic means and hence changing currents to said heating element to afford a change in power thereto throughout said boil range.

12. A thermostatic control for controlled temperature of a vessel having a boil range and heated by a heating element energizable from a voltage source, comprising, in combination, a sensing element variable in impedance and adapted to be positioned in heat exchange relationship primarily with said vessel and only secondarily in heat exchange relationship with said heating element, U-shaped bimetallic means, control contacts operated by said bimetallic means to control flow of current through said heating element from said voltage source, means connected to said sensing element and to said voltage source to impart heat to said bimetallic means for controlling movement thereof, proportioning control means including said bimetallic means to vary the power input to said heating element despite a substantially constant temperature of said vessel through a boil range thereof, ambient temperature control means including said U-shaped bimetallic means to affect substantially equally both legs thereof in accordance with changes of ambient temperature, and voltage compensating control means including said U-shaped bimetallic means to affect substantially equally both legs of said U-shaped bimetallic means for increases and decreases of voltage of said voltage source.

13. A thermostatic control for controlled temperature of a vessel having a boil range and heated by a heating element energizable from a voltage source, comprising, in combination, a sensing element variable in resistance and adapted to be positioned in heat exchange relationship primarily with said vessel and substantially insulated from heat exchange relationship with said heating element, U-shaped bimetallic means, control contacts operated by said bimetallic means to control flow of current through said heating element from said voltage source, control winding means connected to said sensing element and to said voltage source to impart heat to said bimetallic means for controlling movement thereof, adjustable means to adjust the operating point of said control contacts, proportioning control means including said bimetallic means to vary the power input to said heating element despite a substantially constant temperature of said vessel through a boil range thereof, ambient temperature control means including said U-shaped bimetallic means to affect substantially equally both legs thereof in accordance with changes of ambient temperature, and voltage compensating control means including said U-shaped bimetallic means to affect substantially equally both legs of said U-shaped bimetallic means for increases and decreases of voltage of said voltage source.

14. A complete thermostatic control for automatically sensing and controlling the temperature of a cooking utensil of an electric surface heating unit having a central aperture and connectable to first and second terminals of a two hundred thirty volt source, said control system comprising, in combination, a sensing coil having a resistance variable with temperature and physically positioned in the center coaxial with said surface heating unit, a heat shield surrounding said sensing coil to make said sensing element relatively insensitive to heat of said surface element and dependent upon heat from the cooking utensil on said surface element, a main on-off switch connected to one terminal of said two hundred thirty volt source, first and second thermostat contacts, a U-shaped composite member having first and second legs with said first leg being a first bimetal and said second leg being insulated from said first leg and comprising second and third separately insulated bimetallic strips, a first support point on the outboard end of said first leg, adjustable means to adjustable support said first end in accordance with the desired cooking utensil temperature, one of said thermostatic contacts being carried on the outboard end of said second leg and the other thermostatic contact being fixedly carried on the thermostat base for cooperation therewith, said third bimetallic strip being at the outboard end of said second leg, a flexible pigtail from the inboard end of said third bimetallic strip to said first voltage source terminal, one end of said surface heating element being connected through said on-off switch to said second voltage source terminal and the other end of said surface heating element being connected through said thermostat contacts to said third bimetallic strip and pigtail to said first voltage source terminal, a control transformer having a secondary and having a primary connected between the electrical neutral of said voltage source and said second voltage source terminal through said on-off switch, a voltage dropping resistance, means for connecting said voltage dropping resistance and said sensing coil in series across said transformer secondary, a control winding wrapped around said second bimetallic strip and connected in parallel with said sensing coil, a voltage compensating winding wrapped around said first bimetallic strip and connected to said voltage dropping resistance, said U-shaped composite structure being relatively stiff whereby said movable thermostat contact remains in approximately the same plane as said support point of said first leg despite adjustments of said support point, the high expansion side of said bimetallic strips all being on a first side of said U-shaped composite structure whereby with ambient temperature changes both legs of the structure flex equally in the same direction to maintain said movable thermostat contact in essentially the same plane as said support point, said sensing coil being responsive to changes of temperature in the cooking utensil to change the resistance in the sensing coil and thus inversely control the current flow through said control winding to cause deflection of said second leg independently of said first leg to thus open and close said thermostat contacts, voltage fluctuations at said voltage source terminals affecting the wattage input to said surface heating element and thus the heat imparted to the cooking utensil and said voltage compensating winding being affected directly proportionately thereto to affect said first leg in essentially the same manner as said second leg to cause increased deflection of both legs for increased voltages whereby the increased conduction current through said third bimetallic strips caused by increased voltage causes more rapid cycling to impart the same amount of heat to said surface heating unit and hence to said cooking utensil for a given desired temperature setting.

15. A temperature control for a vessel heated by a heating element energizable from voltage source terminals, comprising, in combination, first and second control contacts, means to connect said voltage source terminals in circuit relationship with said control contacts and with said heating element for energization thereof, bimetallic means acting on said contacts, sensing control means connected to said voltage source and acting on said bimetallic means to relatively separate said contacts upon increase of temperature of said vessel, manual means to vary the relative position of said control contacts, said contacts being relatively variable in spacing through a boil range for said vessel, proportioning control means including said bimetallic means, said proportioning control means including a flexible pigtail connected to said bimetallic means for passage of load current through said bimetallic means and said pigtail, the variable spacing of said control contacts through said boil range causing variable amounts of load current through said bimetallic means to vary the rate of boiling despite a lack of change of temperature on said sensing control means.

References Cited in the file of this patent
UNITED STATES PATENTS

| | | |
|---|---|---|
| 2,399,423 | Bletz | Apr. 30, 1946 |
| 2,499,906 | Crise | Mar. 7, 1950 |
| 2,510,040 | Rudahl | May 30, 1950 |
| 2,767,295 | Cutler | Oct. 16, 1956 |
| 2,767,296 | Welch | Oct. 16, 1956 |
| 2,801,317 | Goldmontz et al. | July 30, 1957 |
| 2,816,203 | Weeks | Dec. 10, 1957 |
| 2,819,371 | Aldrich et al. | Jan. 7, 1958 |
| 2,846,556 | Whinery | Aug. 5, 1958 |